(12) United States Patent
Sasagawa et al.

(10) Patent No.: US 8,584,655 B2
(45) Date of Patent: Nov. 19, 2013

(54) FUEL HEATING DEVICE

(75) Inventors: Yuuichi Sasagawa, Wako (JP); Yasuo Iwata, Wako (JP); Hirofumi Hanafusa, Wako (JP); Shinichi Imura, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 440 days.

(21) Appl. No.: 12/892,346

(22) Filed: Sep. 28, 2010

(65) Prior Publication Data

US 2011/0073080 A1  Mar. 31, 2011

(30) Foreign Application Priority Data

Sep. 29, 2009  (JP) .................................. 2009-224725
Sep. 29, 2009  (JP) .................................. 2009-224727
Sep. 29, 2009  (JP) .................................. 2009-224729

(51) Int. Cl.
*F02G 5/00* (2006.01)

(52) U.S. Cl.
USPC ............................ 123/557; 123/543; 123/546

(58) Field of Classification Search
USPC ................................................. 123/543, 546
See application file for complete search history.

(56) References Cited

U.S. PATENT DOCUMENTS

| | | | | |
|---|---|---|---|---|
| 4,342,303 | A * | 8/1982 | McCord | ......................... 123/557 |
| 2009/0199822 | A1 | 8/2009 | Doherty | |

FOREIGN PATENT DOCUMENTS

| | | | |
|---|---|---|---|
| JP | 63-147967 | A | 6/1988 |
| JP | 5-26130 | A | 2/1993 |
| JP | 2008-542622 | A | 11/2008 |
| WO | WO 2006/130938 | A1 | 12/2006 |
| WO | WO 2006130938 | A1 * | 12/2006 |
| WO | WO 2009/009846 | A1 | 1/2009 |

* cited by examiner

*Primary Examiner* — Lindsay Low
(74) *Attorney, Agent, or Firm* — Arent Fox LLP

(57) ABSTRACT

A fuel heating device comprises a heater housing (7) including a bottom wall (17), an upper inlet opening (13) provided in an upper part of the heater housing and an outlet opening (18) provided in a lower part of the heater housing diametrically opposite to the inlet opening, and a heater member (9) including a heat emitting portion (9h) received in a middle part of a heating chamber (6) defined by the heater housing. As the inlet opening is provided in an upper part of the fuel housing, bubbles that may be created by the vaporization of the fuel heated by the heater member is allowed to rise upward and then escape out of the inlet opening. The bubbles that have returned to the fuel supply passage (4) are cooled by fresh fuel, and condense to liquid state once again. Therefore, the heater housing and fuel supply passage are kept free from the presence of fuel vapor, and the fuel therein can be pressurized by a fuel pump to a proper level at all times. Also, the presence of fuel vapor in the heating chamber is controlled so that the heater member is prevented from being exposed to the vapor phase of the fuel.

13 Claims, 9 Drawing Sheets

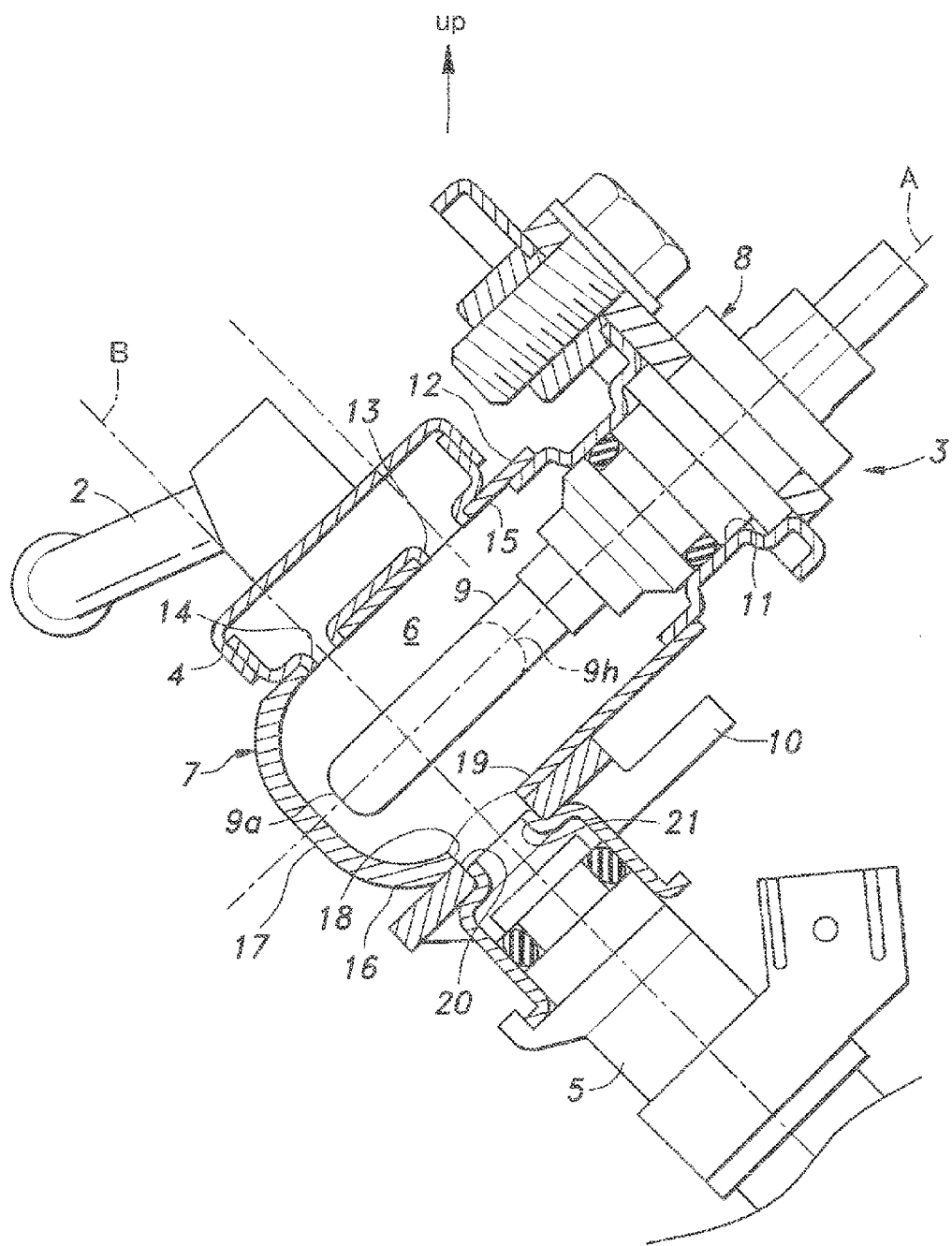

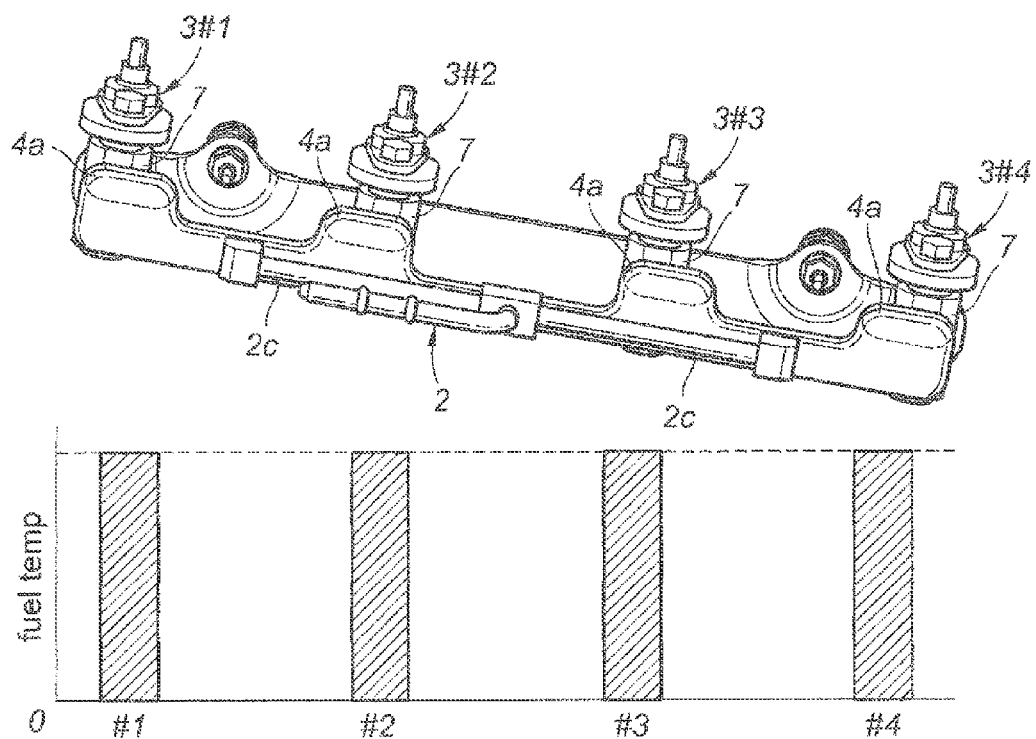

FUEL HEATING DEVICE

TECHNICAL FIELD

The present invention relates to a fuel heating device that is provided upstream of a fuel injection device, such as a fuel injection valve, of an internal combustion engine to heat the fuel before being supplied to the fuel injection device.

BACKGROUND OF THE INVENTION

In an internal combustion engine, it is sometimes necessary to heat the fuel that is to be supplied to a fuel injection device such as a fuel injection valve and carburetor to ensure a reliable startup of the engine. For this purpose, various fuel heating devices have been proposed. Typically, an electric heating device is provided in a fuel supply pipe that leads to the fuel injection device to allow the heat of the electric heating device to be transferred to the fuel flowing along the surface of the heat emitting portion of the electric heating device, but the heat may not be uniformly transferred to the fuel, and a significant amount of cold fuel may be supplied to the fuel injection device depending on the operating condition of the engine. In such a case, the engine may not start up in an adequately stable manner.

Japanese patent laid open publication No. 05-26130 discloses a fuel heating device in which a heater having an elongated heat emitting portion is provided in a heating region defined immediately upstream of a fuel injection valve, and the fuel is allowed to flow along the length of the heat emitting portion of the heater before being supplied to the fuel injection valve.

However, according to this previous proposal, the heat provided by the heater may cause a part of the fuel to be vaporized, and the heater may be exposed to the vapor phase of the fuel. As a result, the fuel may not be efficiently heated, and the fuel may fail to be properly pressurized owing to the presence of the fuel vapor. The exposure of the heater to the vapor phase may even cause a premature failure of the heating wire in the heater.

Internal combustion engine, in particular for automotive uses, are typically provided with a plurality of cylinders. A fuel injection valve is provided for each cylinder, and a fuel delivery pipe having a circular cross section distributes the fuel pressurized by a fuel pump to the different fuel injection valves. The fuel injection valves are typically provided along the length of the fuel delivery pipe, and this may cause an unevenness in the amounts of fuel that the different fuel injection valves receive.

In the arrangement disclosed in WO2003/008796, the number of fuel injection valves serviced by each delivery pipe is reduced so that the unevenness may be minimized. However, this does not entirely solve the problem that the fuel injection valve connected to a downstream end of the fuel delivery pipe receives less fuel than the fuel injection valve connected to an upstream end of the fuel delivery pipe. This problem is particularly acute when a fuel heating unit is provided on the upstream end of each fuel injection valve.

In a fuel heating device provided with a plurality of heating units that correspond to different cylinders of a multiple cylinder engine, fuel is distributed to the different heating units via a horizontally extending fuel distribution pipe or other forms of conduits. The fuel distribution pipe is normally filled with liquid fuel, but the activation of the heating units may cause fuel vapor to migrate into the fuel distribution pipe. In such a case, a mixture of liquid fuel and vapor fuel coexist in the fuel distribution pipe where the liquid fuel fills the lower part of the fuel distribution pipe while the fuel vapor occupies a space above the upper surface of the liquid fuel.

In such a state, if the vehicle is subjected to an acceleration due to various vehicle motions such as cornering, accelerating and decelerating movements, or if the road surface is inclined with respect to a horizontal plane; the upper surface of the liquid fuel tilts in a corresponding manner, and this may prevent proper distribution of fuel to some of the heating units.

To avoid this problem, Japanese UM laid open publication No. 01-74361 proposes to form a downwardly projecting bulge in the part of the fuel distribution pipe adjacent to the inlet end of each fuel injection valve so that the liquid fuel may be available for each fuel injection valve even when the upper surface of the liquid fuel tilts with respect to the axial line of the fuel distribution pipe.

However, according to this previous proposal, the warm part of the fuel rises upward so that the lower part of each downwardly projecting bulge is normally occupied by the cold part of the fuel. Therefore, the cold fuel, instead of the properly heated fuel, may be preferentially supplied to the fuel injection valve.

Furthermore, when a horizontally extending fuel distribution pipe is used, and the vehicle is subjected to an acceleration such as when the vehicle is undergoing a cornering, accelerating or decelerating movement or the road surface is slanted with respect to a horizontal plane, the fuel distribution pipe is tilted from a horizontal orientation, and the warmer fuel is collected in the higher end of the fuel distribution pipe while the colder fuel is collected in the lower end of the fuel distribution pipe. As a result, the temperature of the fuel supplied to each fuel injection valve may varying from one fuel injection valve to another, and this may cause an unstable operation of the engine.

BRIEF SUMMARY OF THE INVENTION

In view of such problems of the prior art, a primary object of the present invention is to provide a fuel heating device that can prevent the exposure of the heater to the vapor phase of the fuel.

A second object of the present invention is to provide a fuel heating device that ensures an efficient heating of the fuel at all times.

A third object of the present invention is to provide a fuel heating device for a multiple cylinder engine that ensures an even distribution of fuel to the different cylinders.

A fourth object of the present invention is to provide a fuel heating device for a multiple cylinder engine that can distribute fuel to different cylinders at a uniform temperature.

According to the present invention, such an object can be accomplished by providing a fuel heating device provided between a fuel supply passage communicating with a fuel source and a fuel injection device for injecting fuel into a combustion chamber of an internal combustion engine, comprising: a heater housing defining a heating chamber therein, and including a bottom wall, an upper inlet opening provided in an upper part of the heater housing and an outlet opening provided in a lower part of the heater housing diametrically opposite to the inlet opening; and a heater member including a heat emitting portion received in a middle part of the heating chamber.

As the inlet opening is provided in an upper part of the fuel housing, bubbles that may be created by the vaporization of the fuel heated by the heater member is allowed to rise upward and then escape out of the inlet opening. The bubbles that have returned to the fuel supply passage are cooled by fresh fuel, and condense to liquid state once again. Therefore, the heater housing and fuel supply passage are kept free from the presence of fuel vapor, and the fuel therein can be pressurized by a fuel pump to a proper level at all times. Also, the presence of fuel vapor in the heating chamber is controlled so that the heater member is prevented from being exposed to the vapor phase of the fuel.

Furthermore, because the inlet opening and outlet opening are provided at difference elevations, a circulating flow of fuel is produced in the fuel chamber, and this contributes to the uniform heating of the fuel in the fuel chamber. This can be enhanced even further if the bottom wall is given with a rounded or otherwise smooth surface.

In particular, if the heater housing includes an upper side wall slanted with respect to a horizontal plane, and the upper inlet opening is formed in a part of the upper side wall at a higher elevation than a center of the heat emitting portion of the heater member, the bubbles are allowed to travel along the slanted upper side wall so that the movement thereof toward the fuel inlet opening is favorably promoted.

According to a preferred embodiment of the present invention, the heater housing further includes a lower inlet opening provided in a lower part of the upper side wall on a same side of the heater housing as the upper inlet opening. This can be favorably achieved if the fuel supply passage is partly defined by a fuel case attached to an upper side wall of the heater housing, and having a back wall encompassing both the upper and lower inlet openings, and a pair of outlet ports formed in the back wall so as to align with the upper and lower inlet openings. Thereby, the fuel that is expelled from the upper inlet opening along with the bubbles is made up for by the fuel that is admitted from the lower inlet opening so that the circulation flow of the fuel in the heating chamber is promoted even further. Also, a relatively cold part of the fuel in the fuel supply passage is preferentially admitted into the heating chamber from the lower inlet opening, and this contributes to the uniform heating of the fuel across the fuel supply passage and heating chamber. Such a circulation flow is particularly enhanced if the fuel housing has a cylindrical shape having a central axial line slanted with respect to a vertical plumb line and a hemispherical bottom wall.

Preferably, the upper inlet opening has a greater opening area than the lower inlet opening. Thereby, not only relatively cold fuel is introduced into the heating chamber via the lower inlet opening but also relatively warm fuel is introduce into the heating chamber via the upper inlet opening so that the overall heating efficiency by the heater member can be improved.

In a particularly preferred embodiment of the present invention, the heat emitting portion of the heater member comprises a rod-shaped portion which extends along the axial line of the heater housing and terminates at a small distance from the bottom wall of the heater housing. The heater member heats the fuel in the heating chamber, and creates an upward flow of the fuel. This combined with the creation of bubbles ensures that the bubbles reach the upper inlet opening, and that a circulating convection flow is promoted in the heating chamber.

In the case of a multiple cylinder engine, the fuel heating device may comprise a plurality of heater housings, a fuel case elongated in an axial direction thereof and provided with a plurality of fuel outlet ports communicating with inlet openings of the corresponding heater housings and at least one fuel inlet port provided at an equal distance from each of the corresponding fuel outlet ports.

Thereby, the fuel from the at least one fuel inlet port is distributed evenly to the associated fuel outlet ports in terms of flow rate and pressure. The evenly distributed fuel is heated by each heater member evenly for each cylinder. Typically, a pair of fuel outlet ports are provided in the fuel case for each fuel inlet port. If there are four or more cylinders, there may be two or more inlet ports. In such a case, a tournament flow system may be provided for the fuel supply passage so that an even distribution of fuel from a common source to different cylinders may be ensured.

In such a case, the fuel outlet ports of the fuel case may be placed at a higher elevation than the fuel inlet ports thereof. Thereby, the fresh cold fuel admitted from the fuel inlet port pushes the fuel already received in the fuel case and warmed by heat conduction from the heater housing to be pushed upward toward the fuel outlet port so that the warmer part of the fuel is preferentially pushed into each heating chamber. Therefore, the heating efficiency of the heater member can be improved, and the dissipation of heat from the fuel case can be minimized.

The fuel inlet ports are preferably provided in a lower part of the fuel case so that the fuel flow may occur over the entire height of the fuel case so that very little part of the fuel remains or stagnates in a lower part of the fuel case. This also contributes to the efficient heating of the fuel.

According to a particularly preferred embodiment of the present invention that enables an even distribution of fuel to an engine or a cylinder bank thereof including four cylinders, the fuel case includes a first to fourth outlet ports arranged along the axial line of the fuel case in that order, a first inlet port at a same distance from the first and second outlet ports and a second inlet port at a same distance from the third and fourth outlet ports, an outer section of the fuel case between the first and second outlet ports having a greater cross sectional area than a central section of the fuel case between the second and third outlet ports.

According to another aspect of the present invention, the fuel case is disposed so as to extend horizontally, and a plurality of upwardly protruding humps each defining a locally enlarged internal volume of the fuel case are provided along the axial line thereof so as to correspond to the different heater housings, each fuel outlet port of the fuel case being provided in an upper part of the corresponding hump. Therefore, the fuel heated by the heat conducted from the heater member rises upward in the fuel case, and is collected in the upper part of each hump where the fuel outlet port is located. Therefore, the warmer fuel is preferentially forwarded to each heating chamber so that the fuel efficiency of the fuel heating device can be improved. Also, the warmer fuel is collected in the upper parts of the humps, even when the vehicle is subjected to an acceleration due to cornering or accelerating movements or when the vehicle is tilted due to a slanted road surface, the warmer fuel is retained in the upper parts of the humps, and even those heating chambers communicating with a lower part of the fuel case are allowed to receive a warmer part of the fuel so that the engine can be operated in a stable manner even in a cold condition.

In such a case, if the engine comprises a four inline cylinders, a distance between central axial lines of the two central humps may be greater than a distance between axial lines of each outer hump and adjacent central hump. Thereby, the overall length of the fuel case for the given distances between the two outer fuel heating units can be minimized while ensuring even distribution of the fuel between each adjacent pair of fuel heating units.

BRIEF DESCRIPTION OF THE DRAWINGS

Now the present invention is described in the following with reference to the appended drawings, in which:

FIG. 2 is a sectional side view of a fuel heating unit of the fuel heating device of FIG. 1;

FIGS. 7 to 9 are diagrams illustrating the mode of operation of the fuel heating device of the present invention.

DETAILED DESCRIPTION OF THE PREFERRED EMBODIMENTS

Figure 1:
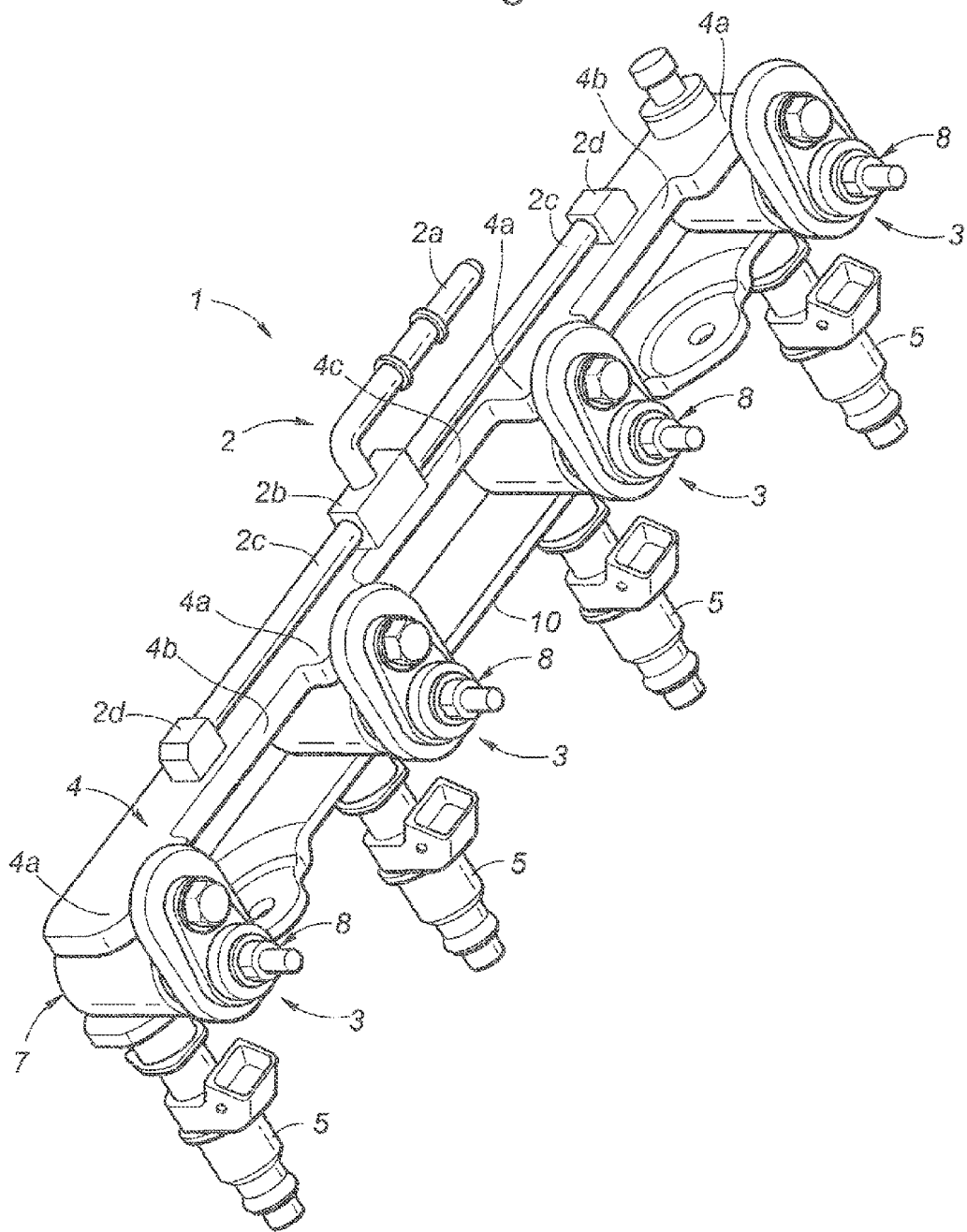
FIG. 1 is a perspective view of a fuel heating device given as a first embodiment of the present invention.

Referring to FIGS. 1 and 2, a first embodiment of the fuel heating device of the present invention is described in the following. The vertical and horizontal directions in FIG. 2 substantially coincide with the actual horizontal direction and vertical direction, respectively.

FIG. 1 illustrates a part of a fuel supply system 1 of an inline, four-cylinder internal combustion engine using ethanol or a mixture containing ethanol for the fuel. This fuel supply system 1 includes, for each cylinder, a fuel heating unit 3 for heating the fuel supplied by a common fuel supply pipe 2, and a fuel injection valve 5 provided adjacent to an intake port of the corresponding cylinder for injecting the fuel heated by the fuel heating unit 3 into a corresponding combustion chamber of the engine. In the illustrated embodiment, each fuel injection valve 5 extends at a 45 degree angle with respect to a horizontal plane, but may also extend at any other oblique angles.

The fuel supply system 1 further comprises a fuel supply pipe 2 which includes an upstream part 2a and a pair of downstream parts 2c branching out from the upstream part 2a via a branching connector 2h. The two downstream parts 2c extend in tandem to each other, and in parallel to the cylinder row of the engine. The upstream part 2a also extends in parallel with the cylinder row except fir the part thereof connected to the branching connector 2b. The downstream parts 2c are equal in length so that the upstream part 2a is connected to a middle point of a single linear pipe (downstream parts 2c) via the branching connector 2b in appearance.

The downstream ends of the downstream parts 2c are connected to a fuel case 4 that extends in parallel with the cylinder row and having a rectangular cross section which is elongated in a direction perpendicular to the axial lines of the fuel injection valves 4 whereas the fuel supply pipe 2 is made of a metallic pipe member having a circular cross section. The fuel case 4 extends so as to encompass the four fuel heating units 3, and are provided with four sets of outlet ports that are connected to the different fuel heating units 3 as will be described hereinafter.

The fuel supply pipe 2 extends generally in parallel with the cylinder row, but the downstream end of the upstream part 2a joins the branching connector extends at a 90 degree angle to the cylinder row. The downstream end of each downstream part 2c of the fuel supply pipe 2 is connected to the fuel case 4 via an elbow connector 2d having an inlet port directed in parallel with the cylinder row and an outlet port directed perpendicular to the cylinder row.

The upstream end of the fuel supply pipe 2 is connected to a fuel pump not shown in the drawings. When the ignition switch is turned from the ACC position to the IG position, the fuel pump is activated, and fuel under a prescribed pressure is supplied to the fuel supply pipe 2. In particular, the fuel fed into the upstream part 2a of the fuel supply pipe 2 is split into two equal parts which are then forwarded to two axially separated parts of the fuel case 4. The two equal parts are equal to each other in terms of flow rate, pressure, temperature and velocity components.

Each fuel heating unit 3 is attached to the lower oblique surface of the fuel case 4 where a corresponding fuel outlet is formed or to the downstream end of the fuel case 4. The fuel heating unit 3 includes a resistive heater 8 which is configured to heat the fuel received in the fuel heating unit 3. An ECU (electronic control unit) not shown in the drawings controls the supply of electric current from an onboard battery to the heater 8 by a duty ratio control according to the temperature of the cooling water and other data.

The fuel heating units 3 are activated upon pressing of an engine start button not shown in the drawings, and a preheating of the fuel is performed at the same time. When the engine start button is pressed for the second time, the fuel injection valves start injecting fuel into the combustion chambers, and the engine is started. Once the engine is started, the fuel heating units 3 continue the heating of the fuel in a post-start mode until the need for heating the fuel ends.

Each fuel injection valve 5 is connected to the downstream end of the corresponding fuel heating unit 3. The fuel injection valve 5 is incorporated with a solenoid valve which is controlled by an ECU, and is configured to inject a prescribed amount of fuel into the combustion chamber of the engine at a prescribed timing by operating the solenoid valve in a corresponding manner. All of the fuel heating units 3 and fuel injection valves 5 are jointly mounted on a common base plate 10 so that the assembling of the fuel heating units 3 and fuel injection valves 5 to the engine may be simplified, and the positional precision of the fuel injection valves 5 with respect to the engine may be ensured.

As shown in FIG. 2, each fuel heating unit 3 is provided between the fuel case 4 and the corresponding fuel injection valve 5, and comprises a heater housing 7 defining a heating chamber 6 therein. The heating chamber 6 receives the working end of the heater 8 therein. In the illustrated embodiment, the heater housings 7 are formed independently from each other and from the fuel case 4. However, if desired, the heater housings 7 may be formed integrally with the fuel case 4 by suitably forming bulges in the fuel case 4.

Each heater housing 7 is given with a substantially cylindrical shape whose axial line A is tilted with respect to the horizontal direction, for instance by 45 degrees. More specifically, the axial length of the heater housing 7 is substantially greater than the outer diameter thereof. The upper axial end of the heater housing 7 is provided with an opening 11 for receiving the heater 8. The lower axial end of the heater housing 7 is formed with a hemispherical bottom wall 17. The bottom wall 17 may be shaped approximately hemispherical as long as a smooth fuel flow is enabled.

The heater 8 comprises a rod-shaped heater member 9 in a free end thereof (or the working end thereof) including a heat emitting portion 9h. The heater member 9 is inserted into the heating chamber 6 while the base end of the heater 8 closes the opening 11. The heater member 9 extends centrally in the heating chamber 6 along the axial line A thereof, and the free end 9a thereof is spaced from the bottom wall 17 of the heater housing 7. The heat emitting portion 9h is located in the free end 9a of the heater member 9. The heat emitting portion 9h is essentially formed by a resistive wire which generates heat when electric current is conducted through the resistive wire. The heat emitting portion 9h may extend from the free end 9a thereof over a large part of the axial length of the heater member, such as 70 to 80% of the axial length thereof. In other words, the heat emitting portion 9a of the heater member 9 is limited to a part of the length thereof received within the heating chamber 6.

An upper side wall 12 of the heater housing 7 located above the heat emitting portion 9h faces the upper lateral side of the heat emitting portion 9h with a part-cylindrical slanted surface. The upper side wall 12 is provided with a pair of circular inlet openings 13 and 14 arranged along an upper ridge line 15 of the upper side wall 12 of the heater housing 7. Each point of the ridge line 15 may be defined as a highest point of each circumferential line of the heater housing 7. The upper inlet opening 13 is provided in an uppermost part of the upper ridge line 15 with respect to the axial direction of the heater housing 7. The lower inlet opening 14 is provided in a lowermost part of the upper ridge line 15 with respect to the axial direction of the heater housing 7. In terms of elevation, the upper inlet opening 13 is located above the heat emitting portion 9h of the heater member 9, and the lower inlet opening 14 is located at a substantially same elevation as a middle part of the heat emitting portion 9h. The opening area of the upper opening 13 is greater than that of the lower opening 14.

A lower side wall 16 of the heater housing 7 located below the heat emitting portion 9h faces the lower lateral side of the heat emitting portion 9h with a part-cylindrical slanted surface. The hemispherical bottom wall 17 of the heater housing 7 faces the free end 9a of the heater member 9 with a concave surface thereof. The lower side wall 16 is formed with a circular outlet opening 18 located in a lowermost part of a lower trough bottom 19 of the lower side wall 16 of the heater housing 7. Each point of the lower trough bottom 19 may be defined as a lowest point of each circumferential line of the heater housing 7. Therefore, the outlet opening 18 is located lower than a middle point of the heat emitting portion 9h, and diametrically opposite to the inlet openings 13 and 14.

The base plate 10 is formed with a through hole 20 that aligns with the outlet opening 18 of the heater housing 7. The fuel injection valve 5 is mounted on the base plate 10 in such a manner that a fuel inlet hole 21 of the fuel injection valve 5 formed in an axial end thereof aligns with the through hole 20, and the axial line B of the fuel injection valve 5 extends perpendicularly to the axial line A of the heater housing 7. In other words, the axial line B of the fuel injection valve 5 is at a 45 degree angle with respect to the horizontal plane, and passes through the center of the heater housing 7.

In the illustrated embodiment, the axial line B of the fuel injection valve 5 aligns with the lower inlet opening 14 and outlet opening 18, and is offset from the upper inlet opening 13 along the central axial line A of the heater housing 7. Also, the axial lines of the fuel injection valve 5, upper inlet opening 13, lower inlet opening 14 and outlet opening 18 for each cylinder are all located on a common plane.

The fuel case 4 is provided with four humps 4a in an upper part thereof so as to correspond to the different cylinders and hence to the different fuel heating units 3. The humps 4a are defined by the obliquely upwardly protruding upper wall of the fuel case 4, and provide locally enlarged internal volumes.

In the illustrated embodiment, the fuel case 4 is thus provided with two inlet ports and four sets of outlet ports. Each set of outlet ports include a pair of outlet ports aligning with the upper inlet opening 13 and lower inlet opening 14 of the corresponding heater housing 7. As shown in FIG. 1, the fuel supply pipe 2 and fuel case 4 jointly form a tournament flow system that evenly distributes the fuel fed from the upstream part 2a of the fuel supply 2 to the four sets of fuel outlet ports of the fuel case 4 for the four different cylinders by splitting the flow at the branch connector 2b and elbow connectors 2d. In particular, each fuel inlet port of the fuel case 4 is located at an equal distance from the two adjacent sets fuel outlet ports so that the fuel flow from the upstream part 2a of the fuel supply 2 is split evenly between the two downstream parts 2c, and the fuel flow from each downstream part 2c is split evenly between the two inlet ports of the fuel case 4. Also, to assist the even distribution of the fuel flow, the cross sectional area of the outer section 4b of the fuel case 4 between one of the outer humps 4a and adjacent central hump 4a is equal to that between the other outer hump 4a and adjacent central hump 4a, and the cross sectional area of the outer section 4b of the fuel case 4 between each outer hump 4a and adjacent central hump 4a is greater than that of the central section 4c between the two central humps 4a.

Because the fuel supply system 1 is disposed such that the fuel case 4 extends horizontally during normal use, and the cross sectional area of the central section 4c is smaller than those of the outer sections 4b, the fuel introduced from each inlet port is substantially exclusively and evenly forwarded to the two sets of adjacent outlet ports. The central section 4c is longer than that of the outer sections 4b, and this also contributes to directing the fuel introduced from each inlet port substantially exclusively to the two adjacent sets of outlet ports. The fuel case 4 has a continuous interior which is common to all of the fuel heating units 3, and has a corresponding large volume. This also contributes to the even distribution of the fuel to the four fuel heating units 3 by avoiding temporal depletion of fuel for the fuel injection valves 5.

Figure 3A:
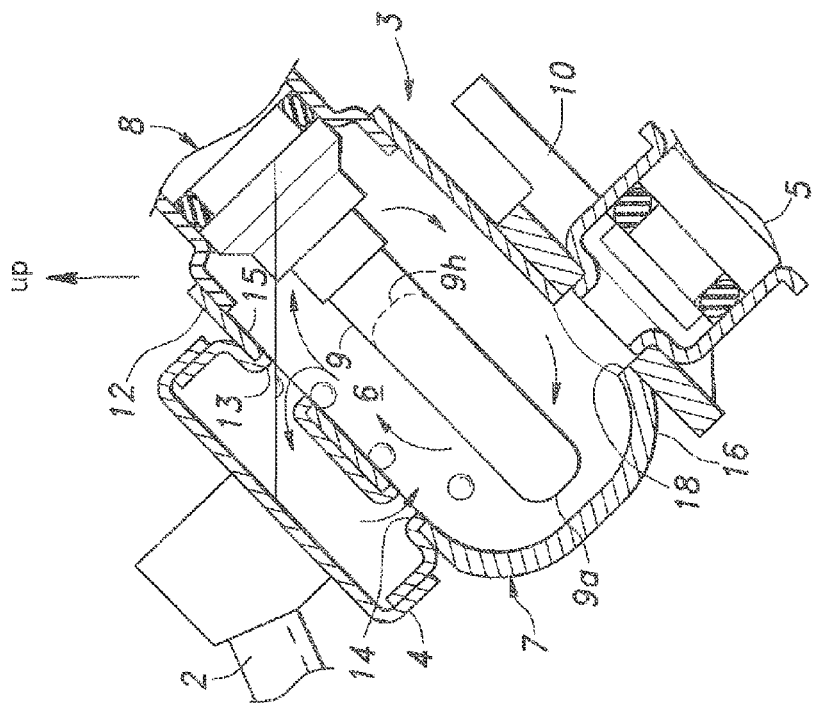
FIGS. 3a and 3b are views similar to FIG. 2 for illustrating the mode of operation of the first embodiment.
Figure 3B:
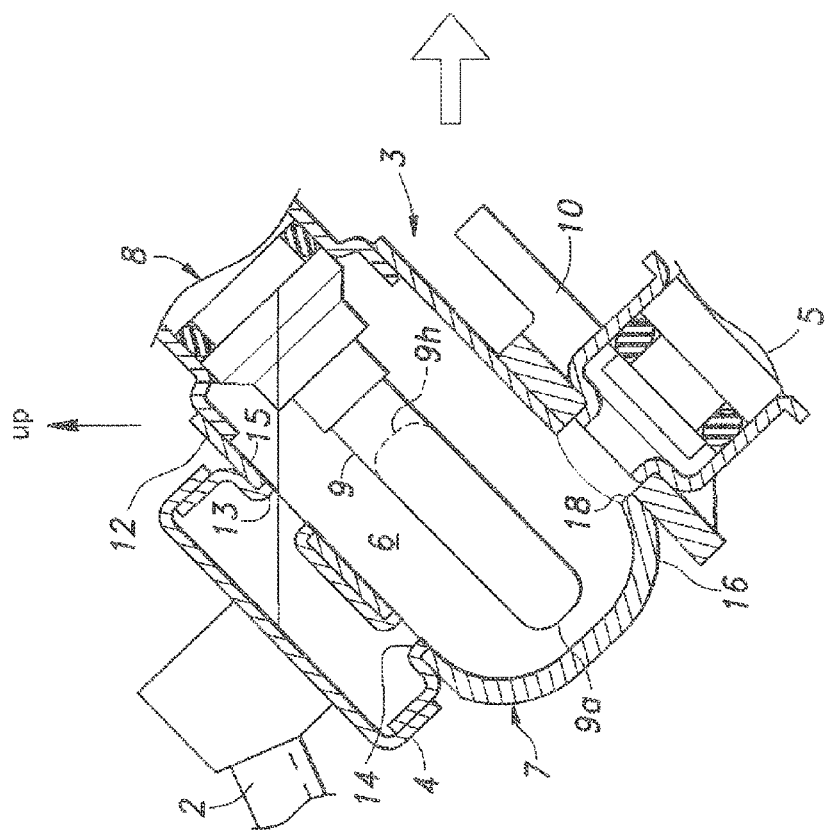

The mode of operation of the fuel heating unit 3 of the illustrated embodiment is described in the following with reference to FIGS. 3a and 3b. Prior to the heating of the fuel, the ignition switch is changed from the ACC position to the IG position, and the fuel of a prescribed pressure is supplied to the heating chamber 6. At this time, air may be trapped in a part of the fuel heating unit 3, in particular in upper parts of the heating chamber 6 and the fuel case 4 which are higher than the upper inlet opening 13.

The turning of the ignition key to the START position causes the heat emitting portion 9h to be heated. As a result, as illustrated in FIG. 3b, the fuel around the heat emitting portion 9h is heated, and then moves upward in the heating chamber 6. The warm fuel rises along the upper side wall 12 of the heater housing 7 in an oblique direction while the cold fuel moves downward along the lower side wall 16 of the heater housing 7. Therefore, a clockwise convection flow as seen FIG. 3b is created within the heater housing 7, and this causes the fuel to be uniformly heated. The outlet opening 18 is therefore located such that the fuel flowing out of the outlet opening 18 does not substantially obstruct this convection flow.

If the fuel around the heat emitting portion 9h is overheated, fuel vapor is produced, and bubbles consisting of the fuel vapor rises rapidly because of the small specific weight of the fuel vapor combined with the convection flow. The bubbles quickly reach the upper side wall 12, and move along the upper side wall 12 obliquely upward. Even when bubbles are generated in other parts of the heating chamber 6 or prevented from rising vertically, the bubbles are eventually collected in the area of the ridge line 15 and rise upward.

The bubbles that have risen along the ridge line 15 are eventually expelled from the upper inlet opening 13 to the fuel case 4. As the bubbles flow out of the heating chamber 6 into the fuel case 4, the displaced volume in the heating chamber 6 is made up for by an inflow of fuel from the fuel case 4 via the lower inlet opening 14. This promotes the flow of the warmed fuel from the heating chamber 6 into the fuel case 4 via the upper inlet opening 13, and the flow of the cold fuel from the fuel case 4 into the heating chamber via the lower inlet opening 14 so that the counter clockwise convection flow across the fuel case 4 and heating chamber 6 as shown FIG. 3b is promoted. As a result, the overall temperature of the fuel in the heating chamber 6 is controlled, and the generation of bubbles is avoided. This in turn prevents the exposure of the heat emitting portion 9h to the fuel vapor. The fuel vapor is a poor conductor of heat as compared to the liquid fuel. Also, the temperature of the fuel is kept uniform over the entire heating chamber 6, and this also contributes to the efficient heating of the fuel. The bubbles that are forwarded to the fuel case 4 is favorably cooled by the liquid fuel of a relatively low temperature that is stored in the fuel case 4, and are allowed to condense into liquid fuel. Therefore, the amount of fuel vapor that may be present in the fuel case 4 can be minimized, and this allows the fuel to be properly pressurized.

As the upper inlet opening 13 is located in an upper part of the upper side wall 12, and the lower inlet opening 14 is located in a lower part of the upper side wall 12, the counter clockwise convection flow is amplified, and the exchange of fuel between the fuel case 4 and heating chamber 6 is actively performed so that the a uniform temperature distribution across the fuel case 4 and heating chamber 6 can be achieved. As the upper inlet opening 13 is located in an upper part of the upper side wall 12, a gas component that may be present in the heating chamber 6 can be quickly removed to the fuel case 4 so that the presence of gas or bubbles in the heating chamber 6 can be minimized. As the lower inlet opening 14 is located in a lower part of the upper side wall 12, the cold fuel in the fuel case 4 can be readily admitted into the heating chamber 6 so that the fuel in the fuel case 4 and heating chambers 6 is generally warmed, and this contributes to the favorable control of the temperature in the heating chambers 6.

When the engine is actually started by turning the ignition key to the START position for the second time, the fuel in the heater housing 6 is forwarded to each fuel injection valve 5 to be injected into the corresponding combustion chamber, and the fuel corresponding in amount to that injected by the fuel injection valve 5 is supplied from the fuel case 4 to the heating chamber 6. As the opening area of the upper inlet opening 13 is greater than that of the lower inlet opening 14, the fuel from the fuel case 4 is at least partly admitted into the heating chamber 6 via the upper inlet opening 13. Therefore, the relatively warm fuel located in the upper part of the fuel case 4 is preferentially forwarded to the heating chamber 6, and this contributes to the improvement in the efficiency of heating the fuel.

As the outlet opening 18 of the heater housing 7 is located on the opposite side of the inlet openings 13 and 14 with respect to the heat emitting portion 9h, the fuel that has flowed into the heating chamber 6 via the inlet openings 13 and 14 is heated by the heat emitting portion 9h before leaving the heating chamber 6 from the outlet opening 18 without fail. As the outlet opening 18 is located lower than the middle point of the heat emitting portion 9h of the heater member 9, the bubbles that may be produced in the heating chamber 6 are prevented from being expelled from the outlet opening 18, and hence from being forwarded to the fuel injection valve 5.

Figure 4:
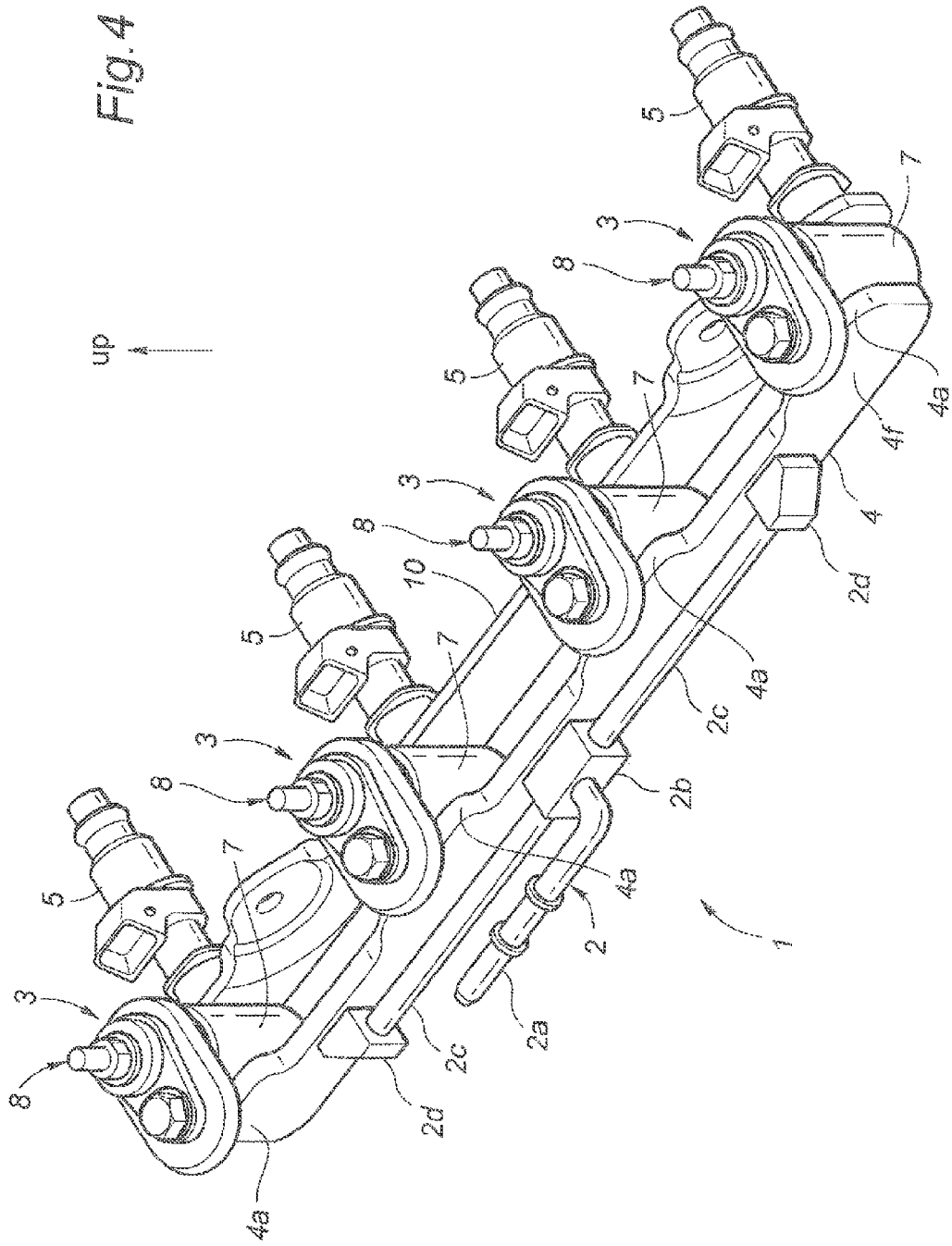
FIG. 4 is a perspective view of a fuel heating device given as a second embodiment of the present invention.
Figure 5:
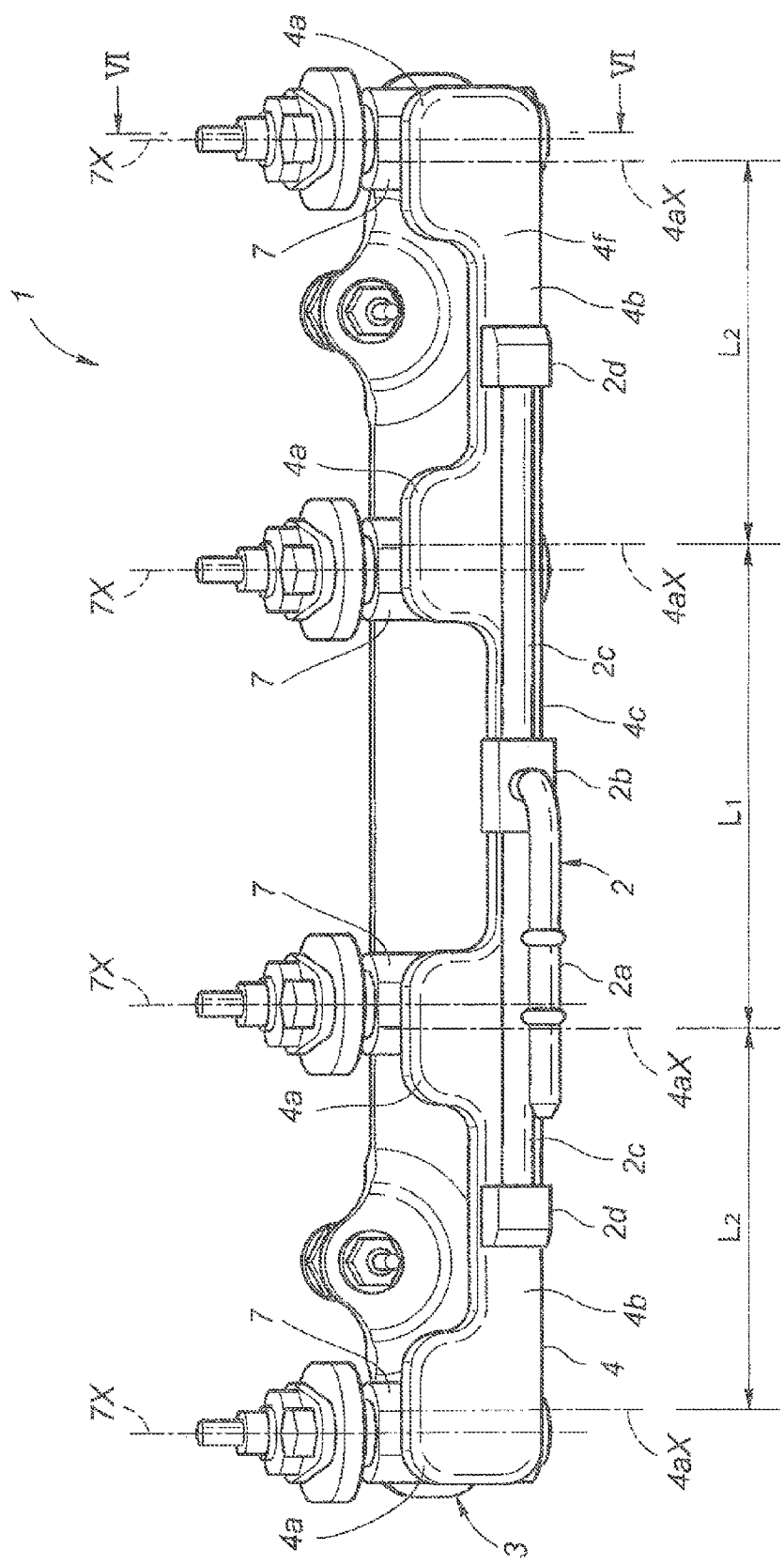
FIG. 5 is a front view of the fuel heating device of the second embodiment.
Figure 6:
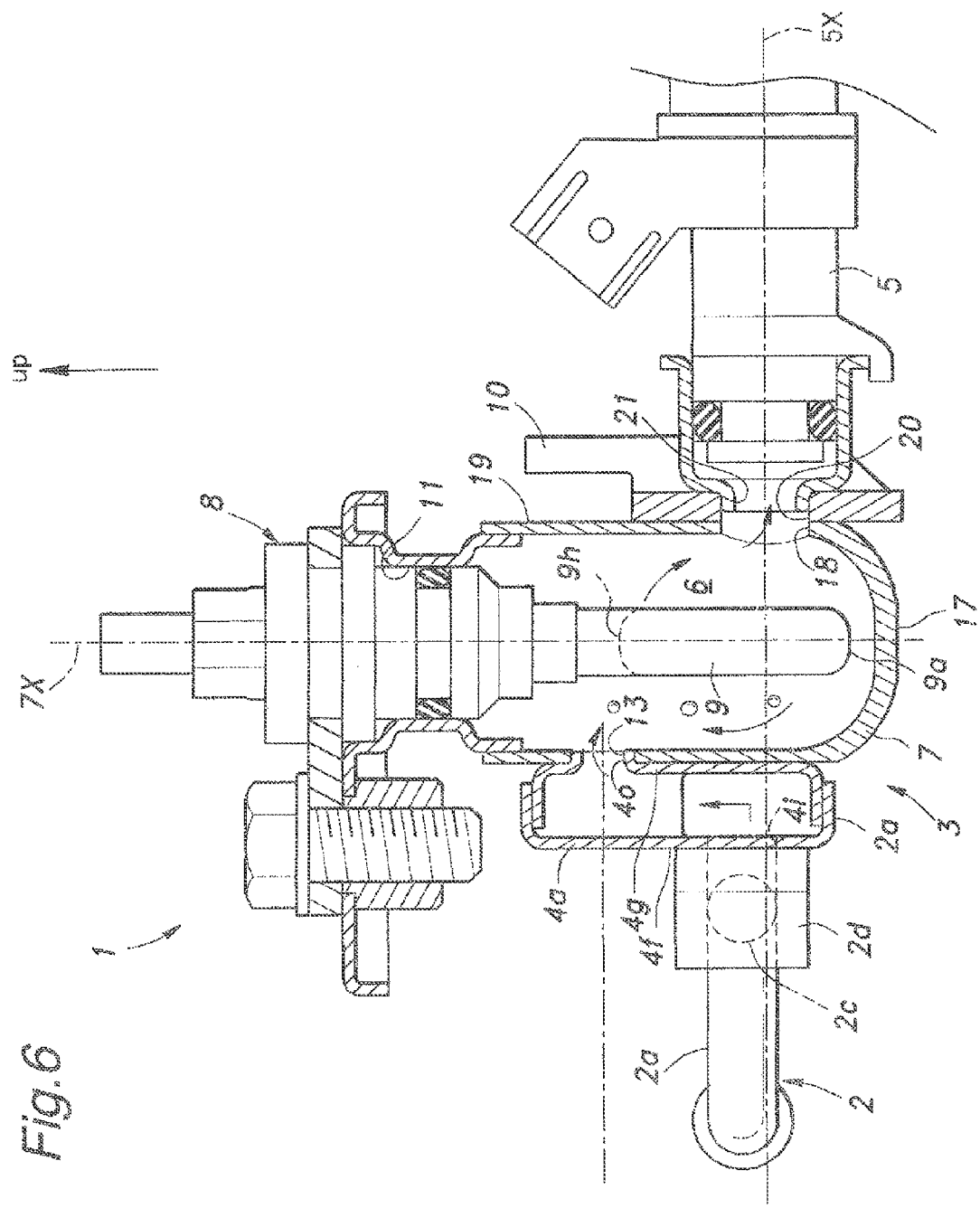
FIG. 6 is a section view of a fuel heating unit of the fuel heating device of FIGS. 4 and 5.

FIGS. 4 to 6 show a second embodiment of the present invention. In these drawings, the parts corresponding to those of the first embodiment are denoted with like numerals without repeating the description of such parts.

In this embodiment, the engine again consists of an inline, four-cylinder internal combustion engine using ethanol or a mixture containing ethanol for the fuel. The fuel supply system 1 for this engine comprises, for each cylinder, a fuel injection valve 5 for injecting fuel into the intake port of the corresponding cylinder and a fuel heating unit 3 connected to an upstream end of the fuel injection valve 5.

The fuel supply system 1 further comprises a fuel supply pipe 2 which includes an upstream part 2a and a pair of downstream parts 2c branching out from the upstream part 2a via a branching connector 2b. The two downstream parts 2c extend in tandem to each other, and in parallel to the cylinder row of the engine. The upstream part 2a also extends in parallel with the cylinder row except for the part thereof connected to the branching connector 2b. The downstream parts 2c are equal in length so that the upstream part 2a is connected to a middle point of a single linear pipe (downstream parts 2c) via the branching connector 2b in appearance.

The downstream ends of the downstream parts 2c are connected to a fuel case 4 that extends in parallel with the cylinder row and have a vertically elongated rectangular cross section whereas the fuel supply pipe 2 is made of a metallic pipe member having a circular cross section. The fuel case 4 extends so as to encompass the four fuel heating units 3, and is provided with outlet ports 4o that are connected to the different fuel heating units 3 as will be described hereinafter.

The fuel supply pipe 2 extends generally in parallel with the cylinder row, but the downstream end of the upstream part 2a joining to the branching connector extends at a 90 degree angle to the cylinder row. The downstream end of each downstream part 2c of the fuel supply pipe 2 is connected to the fuel case 4 via an elbow connector 2d having an inlet port directed in parallel with the cylinder row and an outlet port directed perpendicular to the cylinder row.

The upstream end of the fuel supply pipe 2 is connected to a fuel pump not shown in the drawings. When the ignition switch is turned from the ACC position to the IG position, the fuel pump is activated, and fuel under a prescribed pressure is supplied to the fuel supply pipe 2. In particular, the fuel fed into the upstream part 2a of the fuel supply pipe 2 is split into two equal parts which are then forwarded to two axially separated parts of the fuel case 4. The two equal parts are equal to each other in terms of flow rate, pressure, temperature and velocity components.

The fuel case 4 is provided with a front wall 4f and a back wall 4g which are both planar and in parallel to each other so that a chamber having a vertically elongated rectangular cross section is defined therebetween. This chamber is given with a relatively large volume so that the fuel supplied from the fuel supply pipe 2 via two inlet ports 4i thereof is distributed to the heating chambers 6 evenly in terms of flow rate and temperature. The fuel case 4 is provided with four humps 4a in an upper wall thereof so as to correspond to the different cylinders and hence to the different fuel heating units 3. The humps 4a are defined by the upwardly protruding upper wall of the fuel case 4, and provide locally enlarged internal volumes. More specifically, as illustrated in FIG. 5, the axial lines 7X of the four heater housings 7 are arranged at an equal interval and in parallel to each other. The central axial lines 4aX of the two central humps 4a are slightly offset from the corresponding heater housing axial lines 7X in an outward direction thereby defining a central section 4c of the fuel case 4 having a relatively long axial length, whereas the central axial lines 4aX of the two outer humps 4a are slightly offset from the corresponding heater housing axial lines 7X in an inward direction thereby defining a pair of outer sections 4b having a relatively short axial length. Therefore, the distance L1 between the axial lines 4aX of the two central humps 4a is greater than the distance L2 between the axial lines 4aX of each outer hump 4a and adjacent central hump 4a. Thereby, the overall length of the fuel case 4 for the given distances between the two outer fuel heating units 3 can be minimized while ensuring even distribution of the fuel between each adjacent pair of fuel heating units 3.

The branch connector 2b is fixedly attached to the front wall 4f at an axially central position of the fuel case 4 or centrally between the two central humps 4a. Each elbow connector 2d is fixedly attached to the front wall 4f centrally between the corresponding outer hump 4a and the adjacent central hump 4a. As illustrated in FIG. 6, each elbow connector 2d communicates the downstream part of the fuel supply pipe 2c with the interior of the fuel case 4 via an inlet port 4i formed in the front wall 4f of the fuel case 4. The two inlet ports 4i are formed in a lower part of the front wall 4f at a same elevation.

The fuel supply pipe 2 and fuel case 4 jointly form a tournament flow system that evenly distributes the fuel fed from the upstream part 2a of the fuel supply 2 to the four fuel outlet ports 4o of the fuel case 4 by splitting the flow at the branch connector 2b and elbow connectors 2d. In particular, each fuel inlet port 4i of the fuel case 4 is located at an equal distance from the two adjacent fuel outlet ports 4o so that the fuel flow from the upstream part 2a of the fuel supply 2 is split evenly between the two downstream parts 2c, and the fuel flow from each downstream part 2c is split evenly between the two inlet ports 4i of the fuel case 4. Also, to assist the even distribution of the fuel flow, the cross sectional area of the outer section 4b of the fuel case 4 between one of the outer humps 4a and adjacent central hump 4a is equal to that between the other outer hump 4a and adjacent central hump 4a, and the cross sectional area of the outer section 4b of the fuel case 4 between each outer hump 4a and adjacent central hump 4a is greater than that of the central section 4c between the two central humps 4a.

Because the fuel supply system 1 is disposed such that the fuel case 4 extends horizontally during normal use, and the cross sectional area of the central section 4c is smaller than those of the outer sections 4b, the fuel introduced from each inlet port 4i is substantially exclusively and evenly forwarded to the two adjacent outlet ports 4o. The central section 4c is longer than that of the outer sections 4b, and this also contributes to directing the fuel introduced from each inlet port 4i substantially exclusively to the two adjacent outlet ports 4o. The fuel case 4 has a continuous interior which is common to all of the fuel heating units 3, and has a corresponding large volume. This also contributes to the even distribution of the fuel to the four fuel heating units 3 by avoiding temporal depletion of fuel for the fuel injection valves 5.

The heater housing 7 of each fuel heating unit 3 has a substantially cylindrical shape, and is attached to the back wall 4g of the fuel case 4 so that the cylindrical heater housings 7 oppose the corresponding humps 4a of the fuel case 4. Each heater housing 7 has a hemispherical bottom wall, and the axial length of the heater housing 7 is substantially greater than the outer diameter thereof. The heater housing 7 internally defines a heating chamber 6, and is provided with a fuel inlet 13 aligning with the outlet port 4o of the fuel case 4 and a fuel outlet 18 for forwarding fuel to the corresponding fuel injection valve 5. The upper end of the heater housing 7 is provided with an opening 11 for receiving the heater 8 which is similar to that of the first embodiment.

Each fuel injection valve 5 is axially elongated, and is provided adjacent to an intake port of the corresponding cylinder of the engine. As shown in FIGS. 4 and 6, the heater housing 7 and fuel injection valve 5 are connected to each other via a base plate 10 which commonly supports the heater housings 7 and fuel injection valves 5 so that the assembling of the fuel supply system 1 to the engine is simplified. The base plate 10 is formed with through holes 20 that align with the respective fuel outlets 18 of the fuel housing 7. Each fuel injection valve 5 is provided with an inlet 21 that communicates with the heating chamber 6 via the fuel outlet 18 of the heater housing 7 and through hole 20 of the base plate 10. The fuel injection valve 5 is incorporated with a solenoid valve which is controlled by an ECU, and is configured to inject a prescribed amount of fuel into the combustion chamber of the engine at a prescribed timing by operating the solenoid valve in a corresponding manner.

Referring to FIG. 6, the fuel inlet 13 is provided in an upper end of a cylindrical side wall 19 of the heater housing 7 that defines a side of the heating chamber 6, and the fuel outlet 18 is provided in a lower part of the side wall 19. Each fuel injection valve 5 is disposed horizontally such that the axial line 5X of the fuel injection valve 5 extends horizontally, or perpendicularly to the axial line 7X of the heater housing 7. Thus, the fuel inlet 13 and fuel outlet 18 are located on diametrically opposite sides of the side wall 19 of the heater housing 7, and are vertically offset from each other, with the fuel inlet 13 being located higher than the fuel outlet 18. In the illustrated embodiment, the axial lines of the fuel inlet 13, fuel outlet 18 and heater housing 8 are located on a common plane.

In each of the fuel heating units 3, as the heat emitting portion 9h is heated, the fuel surrounding the heat emitting portion 9h is heated, and rises upward in the heating chamber 6. The cold fuel introduced from the fuel inlet 13 initially flows horizontally, and then flows downward. As a result, a vertical convection flow is generated in the heating chamber 6. If the fuel is overheated by the heat emitting portion 9h, bubbles (fuel vapor) that may generate around the heat emitting portion 9h rise toward the fuel inlet 13. The bubbles are then cooled by the cold fuel flowing into the heater chamber 6 from the fuel inlet 13, and return to the liquid phase. Even if the bubbles fail to be liquefied in the heating chamber 6 and pass by the fuel inlet 13, the bubbles reach the upper end of the heater chamber 6. As the upper part of the heater member 9 does not emit heat, the bubbles that have collected in the upper part of the heater member 9 are eventually liquefied by the cold fuel constantly introduced into the heater chamber 6. As a result, the heat emitting portion 9h is prevented from being exposed to the vapor phase of the fuel. Because the fuel outlet 18 is provided not only diametrically opposite to the fuel inlet 13 but also at a lower elevation than the fuel inlet 13, the bubbles are prevented from being forwarded to the fuel injection valve 5, and this allows the engine to be operated in a stable manner.

Figure 7:
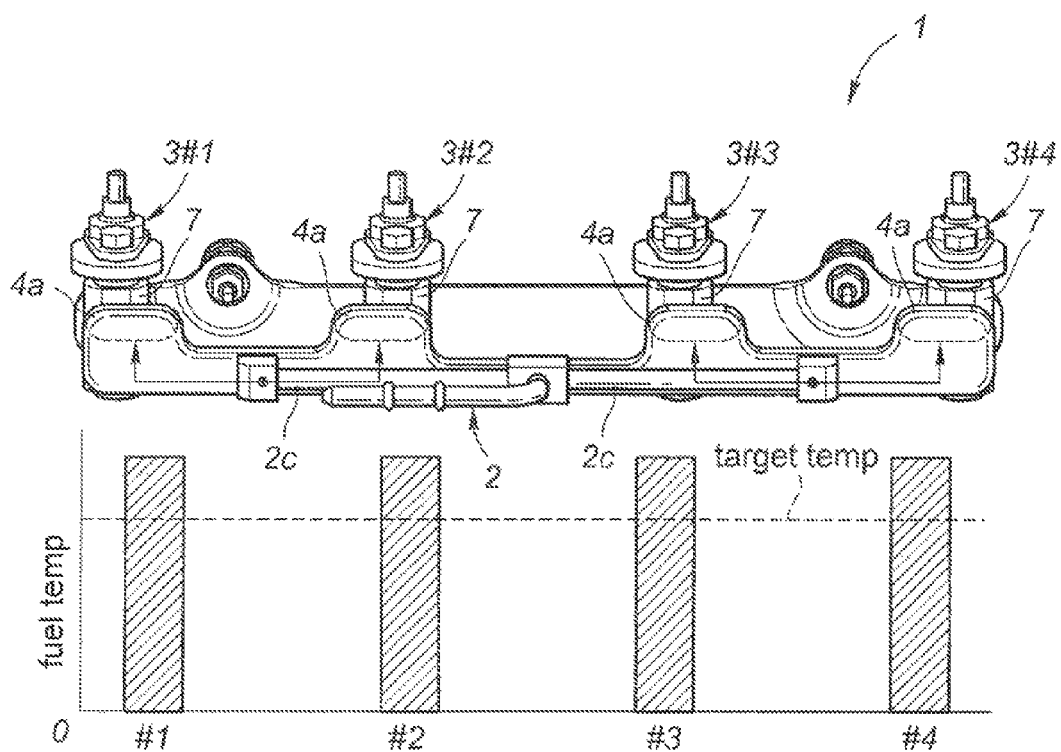

While the fuel in the heater housing 7 is heated by the heater member 9, the heat is also transferred to the interior of the fuel case 4 via heat conduction and via a flow of heated fuel from the heating chamber 6 into the fuel case 4. In the fuel case 4, the fuel adjacent to the back wall 4g tends to be warmer than the fuel in other parts of the fuel case 4, and the warmed fuel rises upward. Therefore, the fuel adjacent to the outlet port 4o is particularly warmer than the fuel in other parts of the fuel case 4. As the inlet port 4i is located lower than the outlet port 4o, the fuel introduced from the downstream part 2c of the fuel supply pipe 2 pushes up the fuel in the fuel case 4, and the warmer fuel is forced toward the outlet port 4o as indicated by arrows in FIG. 7. Therefore, even though the fuel entering the interior of the fuel case 4 from the inlet port 4i may be relatively cold, the relatively warm part of the fuel in the fuel case 4 is preferentially expelled from the outlet port 4o and supplied to the fuel injection valve 5 via the heating chamber 6. Therefore, the heat loss from the fuel case 4 is minimized, and the heating efficiency of the heater 8 can be maximized. In other words, the fuel in the fuel housing 7 can be efficiently heated, and the fuel supplied to the fuel injection valves 5 can be heated to a prescribed level under all conditions.

Because the inlet ports 4*i* of the fuel case 4 are provided in a lower part thereof, the fuel in the lower part of the fuel case 4 pushes up the fuel in the remaining part of the fuel case 4, and very little part of the fuel stays in the fuel case 4 for any prolonged period of time.

Figure 8:
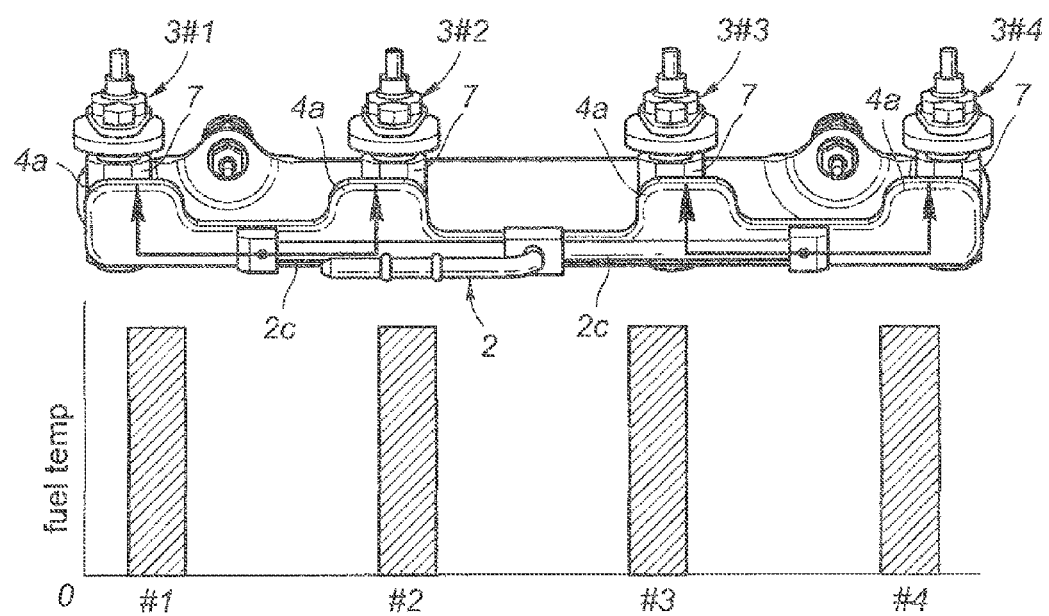

The fuel that is introduced into the fuel case 4 from each of the two inlet ports 4*i* thereof is evenly distributed between the corresponding two heating chambers 6 and hence between the corresponding two fuel injection valves. Under a normal condition, the four fuel injection valves 5 consume a substantially equal amount of fuel. Therefore, as illustrated in FIG. 8, the fuel is heated uniformly by the heater 8 so that the fuel of substantially the same temperature can be supplied to the different fuel injection valves 5, and this ensures a stable operation of the engine.

Also, as the fuel supply system 1 is disposed such that the fuel case 4 extends horizontally during normal use, and the fuel case 4 is provided with four upwardly protruding humps 4*a* so as to correspond to the different fuel heating units 3, even when the fuel case 4 is tilted such that an axial end of the fuel case 4 is raised relative to the other axial end of the fuel case 4 as illustrated in FIG. 9 because of a sharp cornering of the vehicle or other causes, the warm fuel is retained in each of the humps 4*a*, and the supply of warm fuel even to those fuel injection valves 5 brought to lower elevations is not interrupted. Therefore, supply of warm fuel to all of the fuel injection valves 5 is maintained at all times.

In the foregoing embodiment, the fuel was split into two parts at the branch connector and elbow connector, respectively, but may also be split into three or more parts. Also, the number of inlet ports of the fuel case may not be limited to two but may also be three or other numbers depending on the number of cylinders and other factors.

The foregoing embodiments were applied to an engine using a fuel containing ethanol, but is equally applicable to other engines using other fuels such as light oil, gasoline or other liquid fuels. The engine also may not be limited to a four-cylinder engine, but may also be applied to inline engines having a fewer or larger number of cylinders and V-engines having any number of cylinders. The heater housings 7 of the foregoing embodiment were each given with a cylindrical shape having a circular cross section, but may also be given with other shapes such as cubic, prismatic, spherical or the like.

Although the present invention has been described in terms of a preferred embodiment thereof, it is obvious to a person skilled in the art that various alterations and modifications are possible without departing from the scope of the present invention which is set forth in the appended claims.

The contents of the original Japanese patent applications on which the Paris Convention priority claim is made for the present application as well as those of any prior art references mentioned in this application are incorporated in this application by reference.

The invention claimed is:

1. A fuel heating device provided between a fuel supply passage communicating with a fuel source and a fuel injection device for injecting fuel into a combustion chamber of an internal combustion engine, comprising:
    a heater housing defining a heating chamber therein, and including a bottom wall, an upper inlet opening provided in an upper part of the heater housing and an outlet opening provided in a lower part of the heater housing diametrically opposite to the inlet opening; and
    a heater member including a heat emitting portion received in a middle part of the heating chamber, wherein the heater housing includes an upper side wall slanted with respect to a horizontal plane, and the upper inlet opening is formed in a part of the upper side wall at a higher elevation than a center of the heat emitting portion of the heater member.

2. The fuel heating device according to claim 1, wherein the heater housing further includes a lower inlet opening provided in a lower part of the upper side wall on a same side of the heater housing as the upper inlet opening.

3. The fuel heating device according to claim 2, wherein the upper inlet opening has a greater opening area than the lower inlet opening.

4. The fuel heating device according to claim 2, wherein the fuel housing has a cylindrical shape having a central axial line slanted with respect to a vertical plumb line and a hemispherical bottom wall.

5. The fuel heating device according to claim 4, wherein the heat emitting portion of the heater member comprises a rod-shaped portion which extends along the axial line of the heater housing and terminates at a small distance from the bottom wall of the heater housing.

6. The fuel heating device according to claim 4, further comprises a fuel case attached to an upper side wall of the heater housing, and having a back wall encompassing both the upper and lower inlet openings, and a pair of outlet ports formed in the back wall so as to align with the upper and lower inlet openings.

7. A fuel heating device provided between a fuel supply passage communicating with a fuel source and a fuel injection device for injecting fuel into a combustion chamber of an internal combustion engine, comprising:
    a heater housing defining a heating chamber therein, and including a bottom wall, an upper inlet opening provided in an upper part of the heater housing and an outlet opening provided in a lower part of the heater housing diametrically opposite to the inlet opening; and
    a heater member including a heat emitting portion received in a middle part of the heating chamber, wherein the fuel heating device comprises a plurality of heater housings, a fuel case elongated in an axial direction thereof and provided with a plurality of fuel outlet ports communicating with inlet openings of the corresponding heater housings and at least one fuel inlet port provided at an equal distance from each of the corresponding fuel outlet ports.

8. The fuel heating device according to claim 7, wherein a pair of fuel outlet ports are provided in the fuel case for each fuel inlet port.

9. The fuel heating device according to claim 8, wherein the fuel case is disposed so as to extend horizontally, and a plurality of upwardly protruding humps each defining a locally enlarged internal volume of the fuel case are provided along the axial line thereof so as to correspond to the different heater housings, each fuel outlet port of the fuel case being provided in an upper part of the corresponding hump.

10. The fuel heating device according to claim 9, wherein the engine comprises an inline four cylinders, and a distance between central axial lines of the two central humps is greater than a distance between axial lines of each outer hump and adjacent central hump.

11. The fuel heating device according to claim 7, wherein the fuel case includes a first to fourth outlet ports arranged along the axial line of the fuel case in that order, a first inlet port at a same distance from the first and second outlet ports and a second inlet port at a same distance from the third and fourth outlet ports, an outer section of the fuel case between the first and second outlet ports having a greater cross sectional area than a central section of the fuel case between the second and third outlet ports.

12. The fuel heating device according to claim 7, wherein the fuel outlet ports are placed at a higher elevation than the fuel inlet ports.

13. The fuel heating device according to claim 7, wherein the fuel inlet ports are provided in a lower part of the fuel case.

* * * * *